United States Patent [19]

Jaconelli

[11] 4,013,482

[45] Mar. 22, 1977

[54] PROCESS AND APPARATUS FOR THE MANUFACTURE OF DRY SOLID MOLASSES

[75] Inventor: Pierre Jaconelli, Venissieux, France

[73] Assignee: A.V.D. A Votre Disposition, France

[22] Filed: Mar. 16, 1976

[21] Appl. No.: 667,282

[30] Foreign Application Priority Data

May 30, 1975 France .............................. 75.17508

[52] U.S. Cl. ...................................... 127/9; 127/29; 127/58; 159/8; 159/13 A; 159/49; 426/96; 426/658

[51] Int. Cl.² ........................ B01D 1/22; C13F 1/00; C13F 3/00

[58] Field of Search ........... 127/9, 58; 159/8, 13 A, 159/49; 426/96

[56] References Cited

UNITED STATES PATENTS 3,880,668 4/1975 Miller .................................... 127/9

*Primary Examiner*—Joseph Scovronek
*Assistant Examiner*—Sidney Marantz
*Attorney, Agent, or Firm*—Browdy and Neimark

[57] ABSTRACT

A process and apparatus for manufacturing dry, solid molasses of greatly improved storage stability uses thin-layer cooling to ensure that the dried molasses has been cooled to the core. The cooled molasses is then pre-crushed and pulverized by impact without crushing or significant friction.

16 Claims, 10 Drawing Figures

PROCESS AND APPARATUS FOR THE MANUFACTURE OF DRY SOLID MOLASSES

FIELD OF THE INVENTION

The present invention concerns a process and an installation for the preparation of solid, dry molasses, and more particularly to such a process and apparatus by which the dry molasses so prepared has much improved stability and preservability.

BACKGROUND OF THE INVENTION

French Patent No. 70.00,893 dated Jan. 12, 1970, teaches a process and apparatus for producing dry solid molasses, in pieces or as powder, from raw cane or beet molasses. According to this process, the procedure begins in an appropriate device with elaborate drying of the molasses, keeping the dried molasses melted at a temperature at which it exhibits low viscosity, said molasses then being fed into another device ensuring this cooling so as to solidify the divided elements, making it possible to obtain dry, hard pieces or even a powder.

The installation described in this French patent essentially comprises an apparatus for drying liquid molasses and an apparatus for dividing and cooling the molten molasses coming out of the drying apparatus so as to produce dry molasses solidified in pieces, grains or powder.

The accomplishment of such a process with the aid of such an installation has not made it possible to achieve satisfactory results, however. The production of pieces of dried molasses is accomplished simultaneously with its cooling either by means of a crusher or by means of an atomizer. The crusher reheats the molasses, keeping it in a melted state, and, in the storage chamber located at the outlet of the evaporator and upstream from the atomizer, degradation of the dry molasses takes place as a result of the temperature, resulting in formation of a form. This degradation is also known as the "Maillard phenomenon".

In addition, even when as a result of precautions which are incompatible with industrial production, one succeeds in obtaining molasses which is dry and in the form of baggable powder or pieces, the latter cannot be stored for more than two hours, even if the bag is closed.

This instability of the powder grains which rapidly absorb humidity is due to the fact that the droplets of melted molasses which gave rise to them did not have a chance to become dehydrated and cooled at the core, but simply on the surface, and as a result the grains are very sensitive to atmospheric humidity.

SUMMARY OF THE INVENTION

The present invention is intended to remedy these disadvantages. For this purpose, according to the process which it concerns, immediately after drying in a thin layer, the molasses is cooled, also in a thin layer; after rough precrushing it is then reduced to a powder without squeezing or friction but by impact.

Cooling in a thin layer allows the molasses to cool at the core and reducing to a powder by impact, without compression or significant friction, makes it possible to limit considerably the heating of the molasses and thereby to avoid its caramelization. The powder thus produced may be kept in air for at least two hours and, once produced, after being placed in sealed bags or pouches, for several months.

In order to improve its preservation still further, according to still another characteristic of the present invention, the powder thus produced is tabletted, which not only facilitates dispensing by the user and reduces the volume, but also considerably reduces the uptake of moisture.

These tablets can effectively be preserved for several weeks in air and several months in sealed bags. As a result, the capacities of the bags can be totally independent of the amounts used daily since they can remain open for several weeks without degradation of the product.

Naturally, the tablets can be powdered by the user when they are used, under the same conditions as the dried and cooled molasses.

The preservation conditions of the tablets can be reinforced even further by providing them with a protective coating made of edible material, such as edible paraffin or incorporating water-repellent additives in the powder, of edible quality.

Use of paraffin has the advantage of contributing to the lubrication of the tabletter.

The installation for carrying out this process, which is of the general type described in the above-mentioned French patent, is provided, at the outlet of the thin-layer drying apparatus, with a device for thin-layer cooling, a precrushing device and a device for powdering by impact without compression or friction.

According to one embodiment of the invention, the equipment for thin-layer cooling consists of a horizontal endless belt made of material which is a good heat conductor, driven at a constant rate, and means for spreading the molasses in a thin layer and cooling means, such as a tank with circulating cold water, provided in association with the upper part of the belt, upon which the dried molasses is spread out.

In one version of the embodiment of the invention, the thin-layer cooling device consists of two calendering rollers with parallel axes, between which the molasses is rolled, each of the rollers being transversed internally by a cooling liquid.

In another version of the invention, the thin-layer cooling device is composed of a rotating cylinder within whose interior the molasses is placed and spread finely, the wall of said cylinder being cooled externally by the circulation of a cooling liquid.

The equipment for precrushing the dried and cooled molasses consists on the one hand of at least one scraper mounted at the outlet of the thin-layer cooling device and at the inlet of a hopper for receiving the precrushed molasses and on the other hand, mounted inside this hopper and across the trajectory of the molasses chips broken off by the scraper or scrapers, at least two drums with paddles, caused to rotate and mesh without contact so as to break up said chips and reduce their dimensions.

Advantageously, the device for pulverizing the precrushed molasses is composed of a bladed crusher whose tank is arranged so as to be capable of being emptied after the powder is produced.

For example, this tank may be provided with an emptying orifice equipped with a shutoff valve or of being pivoted on a support so as to be capable of being tilted to a dumping position.

According to another characteristic of the invention, in order to ensure better regularity of distribution of the dried molasses over the cooling equipment, the outlet of the device for drying the molten molasses is provided with an extraction system such as a gear pump with a heated housing, an endless screw or a twin-screw extruder with a heated housing, a vacuum pump or a vertical conveyor with two headed endless belts.

BRIEF DESCRIPTION OF THE DRAWINGS

The present invention will be easily understood with the aid of the description which follows with reference to the appended drawings, showing as nonlimiting examples several embodiments of the installation for accomplishing this process.

DETAILED DESCRIPTION OF PREFERRED EMBODIMENTS

Figure 1:
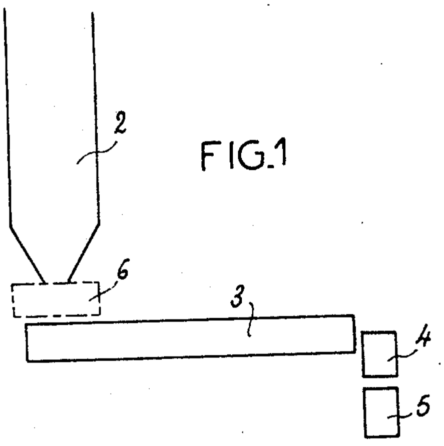
FIG. 1 is a general view of the installation extending from the drying equipment as far as the pulverizing equipment.

As shown in FIG. 1, the installation according to the present application comprises, downstream from apparatus 2 for drying the molasses, which in this example is a thin-layer evaporator, a device 3 for immediately and abruptly cooling the molasses when it has been dried and spread in a thin layer. At the outlet of this device 3 is located a precrushing device 4 after which is disposed a device 5 for pulverization by impact, in other words, without compression or significant friction of the precrushed molasses.

As will be indicated below, at the outlet of evaporator 2 and upstream from device 3 for cooling the molasses, there is advantageously provided as shown in the dot-dash areas of FIG. 1, an extracting device 6, for example of the type shown in FIGS. 7 to 10.

Figure 2:
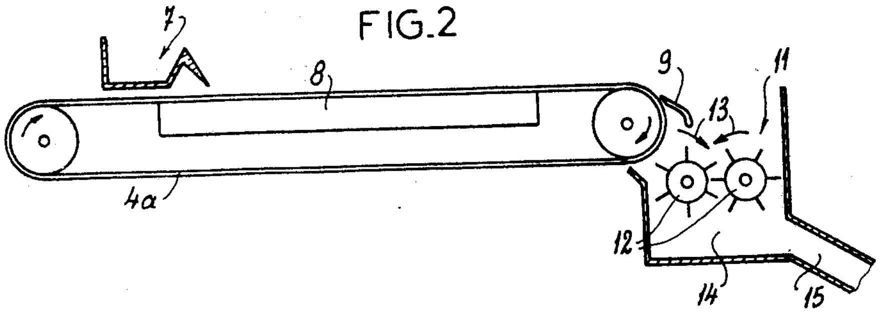
FIGS. 2 and 3 show on an enlarged scale partially cutaway side elevations which illustrate two embodiments of the equipment for cooling the dried molasses, and the precrushing device associated therewith.

In the example shown in FIG. 2, the device for cooling the molasses is composed of an endless belt 4*a* made of stainless steel strips, on the upper surface of which the melted molasses, previously dried, is spread out in a thin layer, by means of overflow tank 7 or by any other similar means such as a remelting tank or a "licking tank". This upper surface of belt 4*a* is cooled by any convenient means such as for example by contact with a tank 8 in which cold water circulates.

The temperature of the molasses at the outlet of evaporator 2 is on the order of 130° C and the molasses must be cooled as rapidly as possible to ambient temperature.

As was pointed out eariler, the molasses is spread in a thin layer over the upper surface of belt 4*a* and a layer thickness of 2 to 4 mm is perfectly suitable for producing its cooling at the core.

At the downstream end of the endless belt 4*a* there is provided a scraper 9 which strips the dried and cooled molasses off the later as well as a precrushing device 11 comprising two drums with paddles 12 caused in rotate in the direction of arrows 13 and to mesh without contact. The two drums 12 are mounted in a hopper 14 for receiving the precrushed molasses on the trajectory of the molasses chips stripped from the endless belt 4*a* by scraper 9. The bottom of hopper 14 is provided with a spout 15 which channels the precrushed molasses in the direction of the pulverizing apparatus 5.

Figure 3:
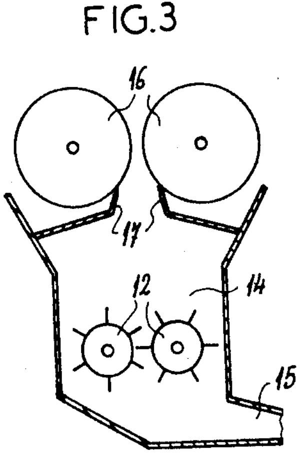

In the version shown in FIG. 3, the device for cooling the previously dried molasses is composed of two cylindrical rollers 16 with parallel axes, between which the molasses is rolled and with one of which is associated a scraper 17 mounted at the entrance to hopper 14, in which are likewise provided the two bladed drums 12 for precrushing. A cooling fluid circulates in each roller 16.

Figure 4:
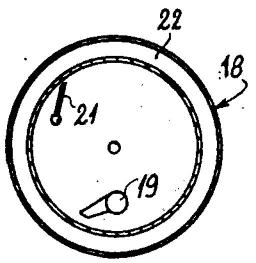
FIG. 4 is a transverse cutaway view showing one embodiment of the cooling apparatus.

In the example shown in FIG. 4, the equipment for cooling the molassses is composed of a double-walled rotating cylinder 18, within which the molasses is distributed and spread by a convenient means, and especially by a wedge shaped dispenser 19 of the type known as a "carp tail", and from which it is stripped by means of a fixed scraper 21, with a cooling fluid circulating in the annular chamber 22 provided within the double wall of cylinder 18.

Figure 5:
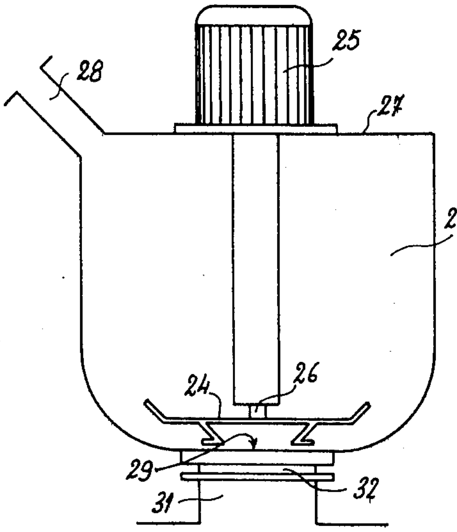
FIGS. 5 and 6 illustrate two sample embodiments of the pulverizing device for the precrushed molasses.
Figure 6:
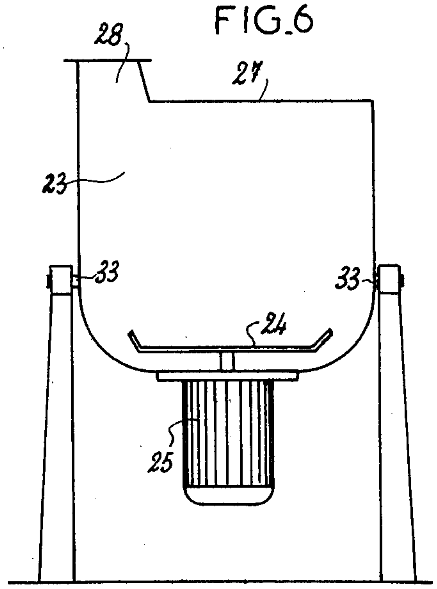

FIGS. 5 and 6 illustrate two versions of an apparatus for pulverizing the previously dried and cooled molasses.

In these two examples, a bladed crusher is used, in other words, the type which is provided with a tank 23 within which a bladed rotor 24 is disposed, driven by a motor 25 with a vertical axis 26.

In the example shown in FIG. 5, motor 25 is supported by cover 27 of vessel 23 in which a spout 28 is provided which serves to introduce the precrushed molasses and which is then connected to the downstream end of spout 15 of the precrushing device 11.

In the bottom of vessel 23 a hole 29 is provided communicating with a spout 31 at the outlet of which the powdered molasses is recovered. This opening 29 is provided with a shut-off valve 32 which allows it to be closed while the molasses is being pulverized.

In the example shown in FIG. 6, motor 25 is suspended at the bottom of vessel 23 and the latter is suspended by two pivots 33 with a horizontal axis, allowing the powdered molasses to be emptied through spout 28 provided in its cover 27 for the introduction of the precrushed molasses.

In these two examples, the molasses chips which have been precrushed are beaten in air by the blades of rotor 24 which rotates at high velocity, without producing any compression or significant friction of the molasses and consequently allowing the latter to be pulverized with a minimum of heating.

Figure 7:
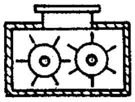
FIGS. 7, 8, 9 and 10 illustrate four embodiments of the extraction system capable of being disposed at the outlet of the drying device and upstream from the device for cooling the dried molasses.
Figure 8:
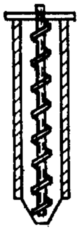
Figure 9:
Figure 10:
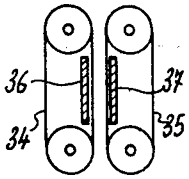

It was pointed out earlier that a device 6 can be provided for extracting the molasses between evaporator 2 and the upstream end of cooling device 3. FIGS. 7 to 10 show four embodiments of such a system which may either be a gear pump with a heated housing, as shown in FIG. 7, or an endless screw with a heated housing, as shown in FIG. 8, or a twin-screw extruder with a heated housing, or a vacuum pump, as shown in FIG. 9, and finally may be a vertical conveyor with two endless belts made of steel, 34 and 35, respectively, each of which is associated with a heating means, 36 and 37, respectively, as shown in FIG. 10.

The fact that this system is incorporated in the installation makes it possible to ensure improved regularity in the distribution of the dried molasses in a molten state over the cooling apparatus and consequently to achieve much more homogeneous production.

Obviously, it follows from the above that the invention is not limited to the embodiments of this process nor to the individual embodiments of the installation for its accomplishment which have been described hereinabove as non-limiting examples; on the contrary, it includes all variations of the embodiment.

What is claimed is:

1. In the process for the manufacture of solid, dry molasses comprising drying the molasses and cooling and dividing the dried molasses, the improvement wherein said cooling and dividing step comprises:

cooling the molasses in a thin layer, immediately after said drying step, said layer being sufficiently thin in relation to the cooling temperature to allow the molasses to be cooled to the core thereof;

precrushing the cooled molasses to coarse particles, and reducing the course particles to a powder by impact without crushing or significant friction.

2. A process in accordance with claim 1, further including the step of forming the powder obtained in said reducing step into pure tablets or with edible additives.

3. A process in accordance with claim 2 further including the step of coating the tablets with an edible protective coating.

4. A process in accordance with claim 3 wherein said coating comprises edible paraffin.

5. A process in accordance with claim 1 wherein said thin layer is on the order of 2–4 mm thick.

6. An apparatus for carrying out the process of claim 1, comprising:

drying means for drying the melted molasses;

cooling means for cooling the dried molasses in a thin layer;

precrushing means for precrushing the cooled molasses to coarse particles; and pulverizing means for reducing the coarse particles to a powder by impact without crushing or significant friction.

7. An apparatus in accordance with claim 6 wherein said cooling means comprises:

a horizontal endless belt made of a material which is a good conductor of heat;

spreading means for thinly spreading the dried molasses onto the upper surface of said belt; and belt cooling means associated with the upper surface of said belt for maintaining the upper surface of said belt at a cool temperature.

8. An apparatus in accordance with claim 7 wherein said belt cooling means comprises a tank in which cold water circulates in contact with the upper surface of said belt.

9. An apparatus in accordance with claim 6 wherein said cooling means comprises two cylindrical drums with parallel axes between which the molasses is rolled in a thin layer and means for circulating fluid within said drums.

10. An apparatus in accordance with claim 6 wherein said cooling means comprises a rotating cylinder, spreading means for spreading the molasses in a thin layer along the internal surface of said cylinder, and means for circulating a cooling fluid in contact with the outside of said cylinder.

11. An apparatus in accordance with claim 6 wherein said precrushing means comprises:

scraper means, mounted at the outlet of said cooling means, for stripping off molasses chips therefrom;

a hopper disposed so as to receive the chips stripped off by said scraper means; and beating means comprising at least two bladed drums, capable of rotating and meshing without contact, mounted within said hopper across the trajectory of the chips, for beating the chips and reducing their dimensions.

12. An apparatus in accordance with claim 6 wherein said pulverizing means comprises a bladed grinder and emptying means for emptying said grinder safter the powder is produced.

13. An apparatus in accordance with claim 12 wherein said emptying means comprises a discharge opening provided with a shutoff valve on the bottom of said grinder.

14. An apparatus in accordance with claim 12 wherein said emptying means comprises a support on which said grinder is pivotable so that said grinder can be tilted to a dumping position.

15. An apparatus in accordance with claim 4, further including extracting means at the outlet of said drying means for distributing with regularity the dried molasses over the inlet to said cooling means.

16. An apparatus in accordance with claim 15 wherein said extracting means comprises a gear pump with a heated housing, an endless screw with a heated housing, a twin-screw extruder with a heated housing, a vacuum pump, or a vertical conveyor with two endless heated belts.

* * * * *